United States Patent
Wei et al.

(10) Patent No.: US 11,339,254 B2
(45) Date of Patent: May 24, 2022

(54) LIGNOCELLULOSE NANOFIBRIL MATERIAL, STABLE FOAM SYSTEM BASED THEREON, PREPARATION METHOD AND APPLICATION THEREOF

(71) Applicants: Southwest Petroleum University, Chengdu (CN); Tianjin University of Science and Technology, Tianjin (CN)

(72) Inventors: Bing Wei, Chengdu (CN); Yangbing Wen, Tianjin (CN); Yuanyuan Wang, Chengdu (CN); Wanfen Pu, Chengdu (CN); Shengen Chen, Chengdu (CN)

(73) Assignees: SOUTHWEST PETROLEUM UNIVERSITY, Chengdu (CN); TIANJIN UNIVERSITY OF SCIENCE AND TECHNOLOGY, Tianjin (CN)

( * ) Notice: Subject to any disclaimer, the term of this patent is extended or adjusted under 35 U.S.C. 154(b) by 105 days.

(21) Appl. No.: 16/762,918

(22) PCT Filed: Apr. 15, 2019

(86) PCT No.: PCT/CN2019/082782
§ 371 (c)(1),
(2) Date: May 9, 2020

(87) PCT Pub. No.: WO2020/177183
PCT Pub. Date: Sep. 10, 2020

(65) Prior Publication Data
US 2021/0214509 A1   Jul. 15, 2021

(30) Foreign Application Priority Data
Mar. 4, 2019   (CN) .......................... 201910160551.7

(51) Int. Cl.
| | |
|---|---|
| C09K 8/94 | (2006.01) |
| C08H 8/00 | (2010.01) |
| C08J 9/00 | (2006.01) |
| C08J 9/30 | (2006.01) |
| C09K 8/58 | (2006.01) |

(52) U.S. Cl.
CPC .............. *C08H 8/00* (2013.01); *C08J 9/0066* (2013.01); *C08J 9/30* (2013.01); *C09K 8/58* (2013.01); *C08J 2397/02* (2013.01); *C09K 8/94* (2013.01)

(58) Field of Classification Search
CPC ... C08H 8/00; C08J 9/0066; C08J 9/30; C08J 2397/02; C08J 2497/02; C08J 2401/04; C09K 8/58; C09K 8/94; C09K 8/60; C09K 8/703; C09K 2208/10; C09K 2208/08; C09K 8/38; C08L 1/04; C08L 97/02; C08B 15/04
See application file for complete search history.

(56) References Cited

U.S. PATENT DOCUMENTS

2019/0309144 A1* 10/2019 Hsieh ..................... H01G 11/86

FOREIGN PATENT DOCUMENTS

| CN | 101182561 | * | 5/2008 |
| WO | WO 2014/175315 | * | 10/2014 |

OTHER PUBLICATIONS https://en.wikipedia.org/wiki/Cellulose_fiber downloaded on Oct. 19, 2021.*

* cited by examiner

*Primary Examiner* — Kumar R Bhushan
(74) *Attorney, Agent, or Firm* — Bayramoglu Law Offices LLC

(57) ABSTRACT

A lignocellulose nanofibril material, a stable foam system based thereon, a preparation method and an application thereof are provided. The lignocellulosic nanofibril material includes the following components: 0.5-20 wt % of wood flour, 0.1-10 wt % of (2,2,6,6-tetramethylpiperidin-1-yl) oxidanyl, 2-25 mmol/g of an oxidant, 6-15 wt % of NaBr, and the remaining is water. The stable foam system based on the lignocellulosic nanofibril material includes: 0.1-1.0 wt % of the lignocellulosic nanofibril material, 0.2-1.0 wt % of a surfactant, 0.1-10 wt % of sodium chloride, 0.1-1.0 wt % of calcium chloride, 0.1-1.0 wt % of magnesium chloride, 0.1-1.0 wt % of sodium sulfate, and a balance of water.

9 Claims, 6 Drawing Sheets

LIGNOCELLULOSE NANOFIBRIL MATERIAL, STABLE FOAM SYSTEM BASED THEREON, PREPARATION METHOD AND APPLICATION THEREOF

CROSS REFERENCE TO THE RELATED APPLICATIONS

This application is the national phase entry of International Application No. PCT/CN2019/082782, filed on Apr. 15, 2019, which is based upon and claims priority to Chinese Patent Application No. 201910160551.7, filed on Mar. 4, 2019, the entire contents of which are incorporated herein by reference.

TECHNICAL FIELD

The present invention belongs to the technical field of oil field exploitation, and more specifically relates to a lignocellulose nanofibril material, a stable foam system based thereon, a preparation method and an application thereof.

BACKGROUND

Foam is a heterogeneous system formed by gas, surfactant and water. Foam is widely used in oil displacement, profile control, water control, anti-gas channeling, fracturing, and other aspects because foam concurrently possesses the features of low density, small weight and certain viscosity, and is capable of flowing continuously to carry water, oil and sand. However, foam is a thermodynamic metastable system. The space occupied by the foam liquid film will spontaneously decrease to reduce the overall surface free energy of the system to maintain its own stability. From a long-term perspective, the collapse of foam is irreversible.

Currently, foam stabilizers mainly include high molecular weight polymers and solid-phase nanomaterials. Nevertheless, the large-scale promotion and application of foam stabilizers in the oil field are greatly limited by the problems of their properties, cost, and sources. Cellulose nanofibril (CNF), separated from plant cellulose, is a kind of filamentous fibers with a diameter of 5-20 nm and a length ranging from several hundred nanometers to several micrometers, which is also one of the most widespread natural polysaccharide polymer materials in nature. As the basic unit of cellulose fiber, the cellulose nanofibril not only has the properties of cellulose, but also has numerous properties of nanomaterials such as large specific surface, strong hydrophilicity, easy modification, high stability, and the like. Therefore, cellulose nanofibrils have good application potential in stabilizing the foam liquid film.

The abilities of ordinary cellulose nanofibrils (CNF) and modified fiber materials on stabilizing foams have been studied at present, which substantiates that amphiphilic CNFs work best. However, such fiber materials need to be grafted with two types of groups together, their processing procedure is complicated, and the production cost is high, thereby limiting the field application of oil fields.

Therefore, developing a low-cost fiber material with similar effects has great significance and practical value for the wide application of foam systems in oil field production.

SUMMARY

For the above problems in the prior art, the present disclosure provides a lignocellulosic nanofibril material, a stable foam system based thereon, a preparation method and an application thereof, which can effectively solve the problems of poor foam stability and high cost in the prior art.

To achieve the above objective, the present invention uses the following technical solutions to solve the technical problems.

A lignocellulosic nanofibril material includes the following components: 0.5-20 wt % of wood flour, 0.1-10 wt % of (2,2,6,6-tetramethylpiperidin-1-yl)oxidanyl (TEMPO), 2-25 mmol/g of an oxidant, 6-15 wt % of NaBr, and a balance of water.

Further, the lignocellulosic nanofibril material includes the following components: 15 wt % of the wood flour, 5 wt % of TEMPO, 10 mmol/g of the oxidant, 12 wt % of NaBr, and a balance of water.

Further, the wood flour has a particle size of 20-120 mesh, and the oxidant is NaClO or $NaClO_2$.

A method for preparing the above-mentioned lignocellulosic nanofibril material includes the following steps:

(1) dispersing the wood flour evenly in water, then adding TEMPO and NaBr and adjusting the pH of the reaction system to 10-10.5, followed by adding oxidant, keeping the pH of the reaction system constant during the reaction, performing the reaction for 0.5-4 h, and finally, washing to obtain an oxidized fiber;

(2) adding the oxidized fiber to water, allowing a concentration of the oxidized fiber to be 0.5-10 wt %, and then performing a homogenization treatment by a high-pressure homogenizer with a homogenization pressure of 40-150 MPa and a homogenization number of 1-20 times to obtain the lignocellulosic nanofibril material (LCNF).

Further, in the oxidized fiber, a content of carboxyl group is 0.3-2.5 mol/L and a content of lignin is 0.1-40 wt %.

A stable foam system based on a lignocellulosic nanofibril material includes the following components in mass percentage:

0.1-1.0 wt % of the lignocellulosic nanofibril material, 0.2-1.0 wt % of a surfactant, 0.1-10 wt % of sodium chloride, 0.1-1.0 wt % of calcium chloride, 0.1-1.0 wt % of magnesium chloride, 0.1-1.0 wt % of sodium sulfate is, and a balance of water.

Further, the stable foam system based on the lignocellulosic nanofibril material includes the following components in mass percentage: 0.1-0.4 wt % of the lignocellulosic nanofibril material, 0.2-1.0 wt % of the surfactant, 0-4.2 wt % of sodium chloride, 0-0.7 wt % of calcium chloride, 0-0.42 wt % of magnesium chloride, 0-0.04 wt % of sodium sulfate, and a balance of water. Preferably, the stable foam system includes 0.1 wt % of the lignocellulosic nanofibril material, 0.4 wt % of the surfactant, 3.44 wt % of sodium chloride, 0.64 wt % of calcium chloride, 0.18 wt % of magnesium chloride, 0-0.018 wt % of sodium sulfate, and a balance of water.

Further, the surfactant is a mixture of sodium secondary alkyl sulfonate and α-alkenyl sulfonate mixed at a molar ratio of 1:1.

A method for preparing the above-mentioned stable foam system based on the lignocellulosic nanofibril material includes the following steps:

(1) dissolving sodium chloride, calcium chloride, magnesium chloride and sodium sulfate in deionized water and stirring evenly;

(2) dissolving a surfactant in the solution obtained in step (1) and stirring evenly;

(3) dispersing the lignocellulosic nanofibril material into the solution obtained in step (2) and stirring evenly; and (4) bubbling air into the solution obtained in step (3) until the foam volume no longer increases to obtain the stable foam system.

The above-mentioned stable foam system based on the lignocellulosic nanofibril material can be used in oil field exploitation, such as profile control, coning control, fracturing, well drilling, foam scrubbing, etc.

In the present invention, the lignocellulose nanofibril material, the stable foam system based thereon, and the preparation method and application thereof have the following advantages.

The wood flour used in the present invention is sawdust waste produced in the wood processing industry in the market. In order to maximize benefits, the present invention directly mixes the wood flour with oxidants, NaBr, and TEMPO for reaction without any chemical treatment. The process is simple, the cost is low, and all lignin is retained in the prepared cellulose nanofibril material. The reaction mechanism is as follows. There are a large number of primary alcohol hydroxyl groups in wood flour. NaClO is the main oxidant in this process, which first forms NaBrO with NaBr. Then, NaBrO oxidizes TEMPO to nitrosonium ions. The nitrosonium ions oxidize the primary alcohol hydroxyl groups in the wood flour to form aldehyde groups (intermediates), and finally, carboxyl groups are generated. The specific reaction formula is as follows:

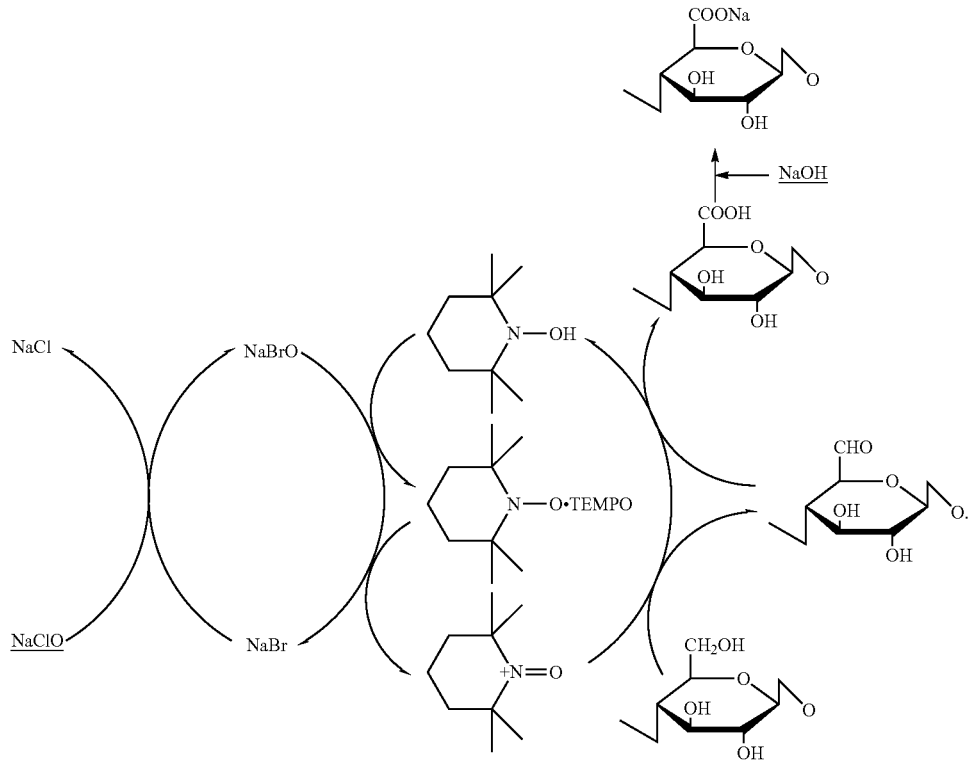

The obtained lignocellulose nanofibril material is used as an important component of the foam system, which cooperates with other components to obtain the foam with good stability. The drainage half-life can be increased by 1.5 times, the foam service life can be doubled, and the drag coefficient and residual drag coefficient can be increased by 5 times.

DETAILED DESCRIPTION OF THE EMBODIMENTS

Embodiment 1

Figure 1A:
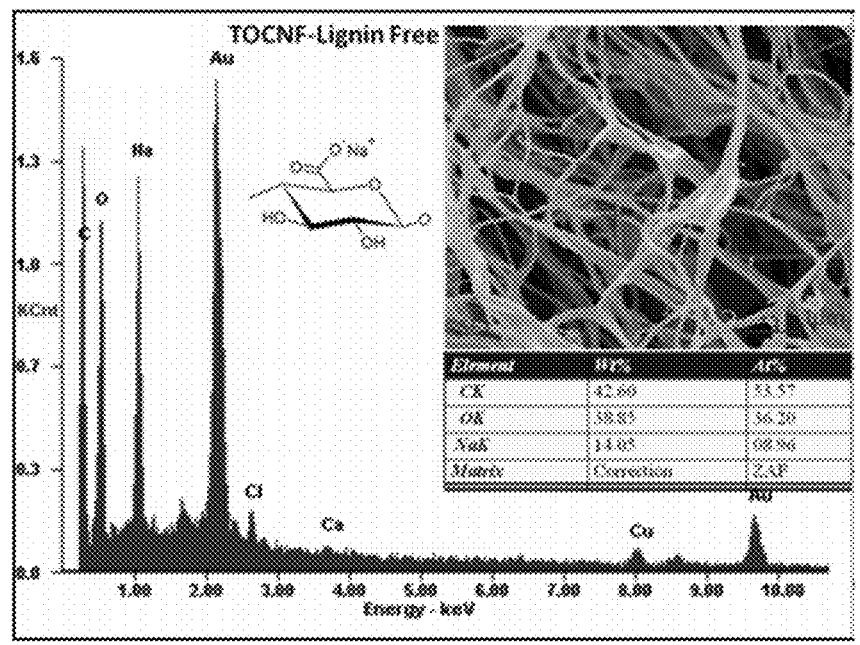
FIGS. 1A and 1B show energy dispersive X-ray (EDX) spectra of LCNF and CNF in embodiment 1.

A lignocellulosic nanofibril material includes the following components: 15 wt % of needlebush wood flour, 5 wt % of (2,2,6,6-tetramethylpiperidin-1-yl)oxidanyl (TEMPO), 10 mmol/g of NaClO, 12 wt % of NaBr, and a balance of water; wherein, the particle size of the needlebush wood flour is 50-100 mesh.

A method for preparing the above-mentioned lignocellulosic nanofiber material includes the following steps.

(1) The needlebush wood flour is evenly dispersed into water and the concentration of the needlebush wood flour is controlled to be 15 wt %. Then, TEMPO and NaBr are added and the pH of the reaction system is adjusted to be 10-10.5, followed by adding NaClO. During the reaction, the pH value of the reaction system is kept constant, the reaction is performed for 4 hours. Finally, an oxidized fiber is obtained after washing.

(2) The oxidized fiber is added to water and the concentration of the oxidized fiber is controlled to be 5 wt %. Then, a homogenization treatment is performed by a high-pressure homogenizer with a homogenization pressure of 50 MPa and a homogenization number of 10 times to obtain the lignocellulosic nanofibril material (LCNF-1).

By a TAPPI T 222 om-11 (2011) method, the lignin content in the LCNF-1 was determined to be 15.5 wt %.

The dosage of NaClO in the above components is changed to be 13 mmol/g, and the remaining components and their contents are not changed. A lignocellulosic nanofibril material is obtained according to the above preparation process and is denoted as LCNF-2 with a lignin content of 11.7%.

The dosage of NaClO in the above components is changed to be 18 mmol/g, and the remaining components and their contents are not changed. A lignocellulosic nanofibril material is obtained according to the above preparation process and is denoted as LCNF-3 with a lignin content of 8.66%.

The dosage of NaClO in the above components is changed to be 25 mmol/g, and the remaining components and their contents are not changed. A lignocellulosic nanofibril material is obtained according to the above preparation process and is denoted as LCNF-4 with a lignin content of 4.49%.

Embodiment 2

The lignocellulosic nanofibril material in embodiment 1 is used to prepare a stable foam system. The foam system includes the following components in mass percentage: 0.1 wt % of the LCNF-1, 0.4 wt % of a surfactant, 3.44 wt % of sodium chloride, 0.64 wt % of calcium chloride, 0.18 wt % of magnesium chloride, 0.018 wt % of sodium sulfate, and a balance of water; wherein, the surfactant is a mixture of sodium secondary alkyl sulfonate and α-alkenyl sulfonate mixed at a molar ratio of 1:1.

A method for preparing the above-mentioned stable foam system includes the following steps.

(1) At room temperature, sodium chloride, calcium chloride, magnesium chloride and sodium sulfate are dissolved in deionized water and stirred evenly.

(2) At room temperature, the surfactant is dissolved in the solution obtained in step (1) and stirred evenly.

(3) At room temperature, the lignocellulosic nanofibril material is dissolved in the solution obtained in step (2) and stirred evenly until no obvious flocculent precipitate is present.

(4) The solution obtained in step (3) is transferred to a foam meter, and air is blown in from the bottom until the foam volume no longer increases, so as to obtain the stable foam system.

Embodiment 3

A stable foam system based on a lignocellulosic nanofibril material includes the following components in mass percentage: 0.1 wt % of the LCNF-2, 0.4 wt % of a surfactant, 3.44 wt % of sodium chloride, 0.64 wt % of calcium chloride, 0.18 wt % of magnesium chloride, 0.018 wt % of sodium sulfate, and a balance of water; wherein, the surfactant is a mixture of sodium secondary alkyl sulfonate and α-alkenyl sulfonate mixed at a molar ratio of 1:1.

A method for preparing the above-mentioned stable foam system includes the following steps.

(1) At room temperature, sodium chloride, calcium chloride, magnesium chloride and sodium sulfate are dissolved in deionized water and stirred evenly.

(2) At room temperature, the surfactant is dissolved in the solution obtained in step (1) and stirred evenly.

(3) At room temperature, the lignocellulosic nanofibril material is dissolved in the solution obtained in step (2) and stirred evenly until no obvious flocculent precipitate is present.

(4) The solution obtained in step (3) is transferred to a foam meter, and air is blown in from the bottom until the foam volume no longer increases, so as to obtain the stable foam system.

Embodiment 4

A stable foam system based on a lignocellulosic nanofibril material includes the following components in mass percentage: 0.1 wt % of the LCNF-3, 0.4 wt % of a surfactant, 3.44 wt % of sodium chloride, 0.64 wt % of calcium chloride, 0.18 wt % of magnesium chloride, 0.018 wt % of sodium sulfate, and a balance of water; wherein, the surfactant is a mixture of sodium secondary alkyl sulfonate and α-alkenyl sulfonate mixed at a molar ratio of 1:1.

A method for preparing the above-mentioned stable foam system includes the following steps.

(1) At room temperature, sodium chloride, calcium chloride, magnesium chloride and sodium sulfate are dissolved in deionized water and stirred evenly.

(2) At room temperature, the surfactant is dissolved in the solution obtained in step (1) and stirred evenly.

(3) At room temperature, the lignocellulosic nanofibril material is dissolved in the solution obtained in step (2) and stirred evenly until no obvious flocculent precipitate is present.

(4) The solution obtained in step (3) is transferred to a foam meter, and air is blown in from the bottom until the foam volume no longer increases, so as to obtain the stable foam system.

Embodiment 5

A stable foam system based on a lignocellulosic nanofibril material includes the following components in mass percentage: 0.1 wt % of the LCNF-4, 0.4 wt % of a surfactant, 3.44 wt % of sodium chloride, 0.64 wt % of calcium chloride, 0.18 wt % of magnesium chloride, 0.018 wt % of sodium sulfate, and a balance of water; wherein, the surfactant is a mixture of sodium secondary alkyl sulfonate and α-alkenyl sulfonate mixed at a molar ratio of 1:1.

A method for preparing the above-mentioned stable foam system includes the following steps.

(1) At room temperature, sodium chloride, calcium chloride, magnesium chloride and sodium sulfate are dissolved in deionized water and stirred evenly.

(2) At room temperature, the surfactant is dissolved in the solution obtained in step (1) and stirred evenly.

(3) At room temperature, the lignocellulosic nanofibril material is dissolved in the solution obtained in step (2) and stirred evenly until no obvious flocculent precipitate is present.

(4) The solution obtained in step (3) is transferred to a foam meter, and air is blown in from the bottom until the foam volume no longer increases, so as to obtain the stable foam system.

Figure 1B:
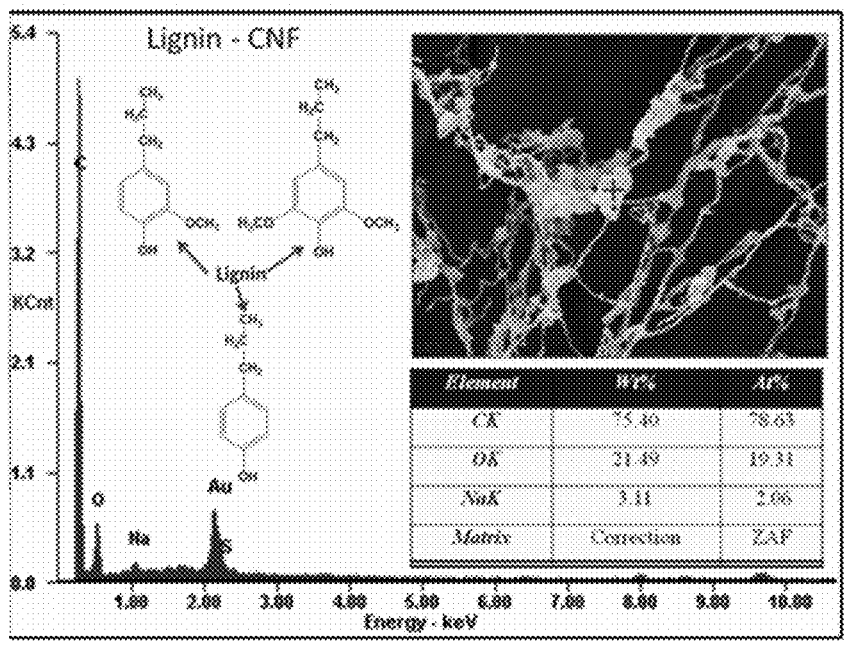

The LCNF-1 prepared in embodiment 1 and the existing CNF (purchased from Tianjin Woodelfbio Cellulose Co., Ltd., with the product name of Microfibrillated Cellulose) were tested, and the EDX spectra thereof are shown in FIGS. 1A and 1B. It can be seen from FIG. 1B that the mass percentages of carbon (C) and oxygen (O) in the LCNF are 75.4% and 21.49%, respectively, which is extremely analogous to the lignin in an elemental composition. However, the contents of C, O, and hydrogen (H) in the CNF show a typical fiber composition. Thus, it is indicated that the LCNF prepared by the present invention contains a certain amount of lignin.

Figure 2A:
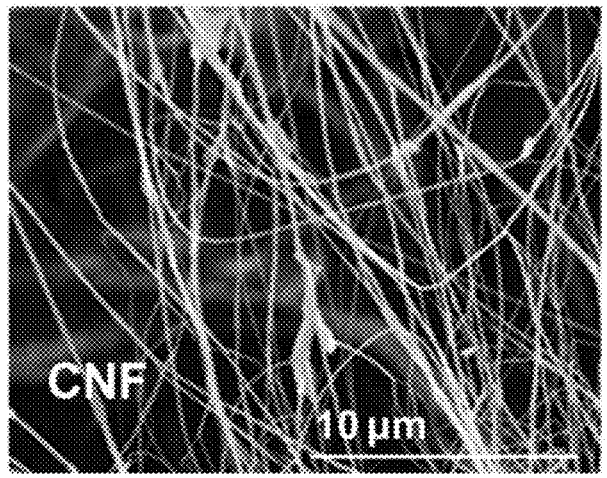
FIGS. 2A and 2B show scanning electron microscopy (SEM) images of LCNF and CNF in embodiment 1.
Figure 2B:
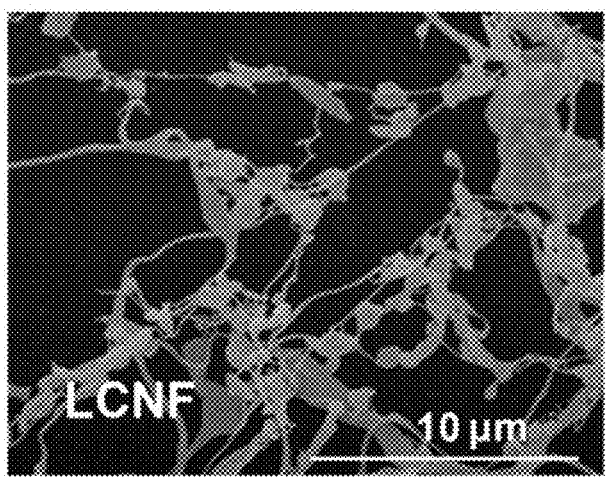

FIGS. 2A and 2B are SEM images of the LCNF-1 obtained in embodiment 1 and the existing CNF. It can be seen from FIGS. 2A and 2B that the surface structure of the LCNF is rougher than that of the CNF, and is suspended with a sheet-like substance. Combining with the results of EDX analysis, it can be proved that the sheet-like substance is lignin.

Figure 3:
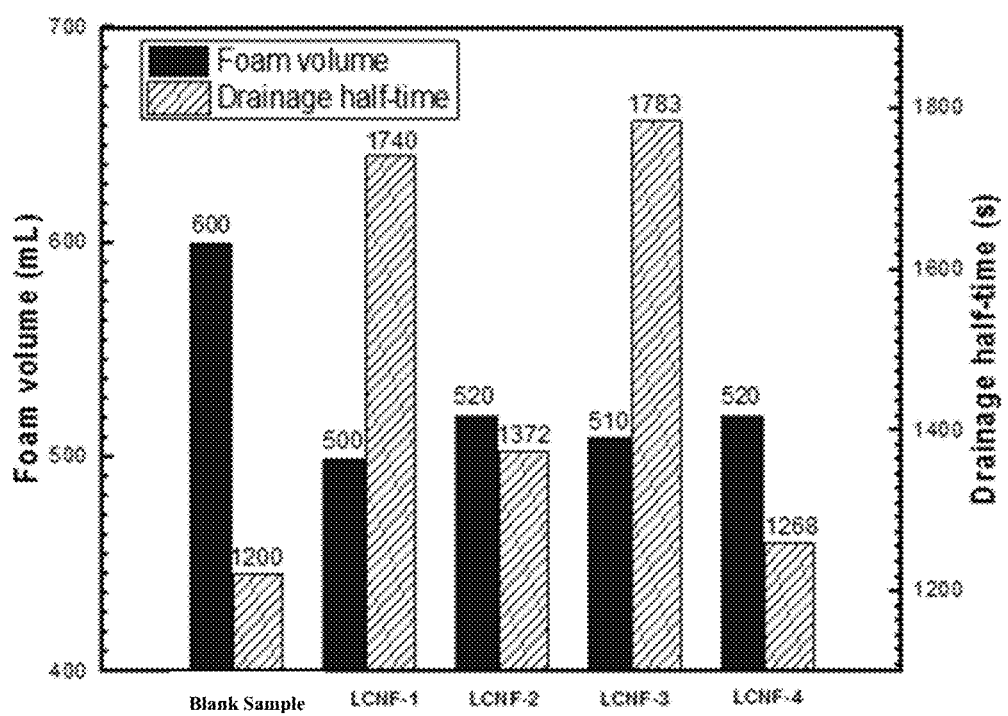
FIG. 3 shows comparison results of the stable foams in embodiments 2-5 and an ordinary foam (as a blank sample only containing a surfactant) in a foaming volume and a drainage half-life (without oil).

FIG. 3 shows comparison results of the stable foams in embodiments 2-5 and an ordinary foam (as a blank sample only containing a surfactant) in a foaming volume and a drainage half-life (without oil). It can be seen from FIG. 3 that due to gravity, the foam volume of the LCNF-stabilized foam is lower than that of the blank sample-stabilized foam, but the drainage half-life of the LCNF-stabilized foam is significantly longer than that of the blank sample-stabilized foam, indicating that the LCNF-stabilized foams have a high stability.

Figure 4:
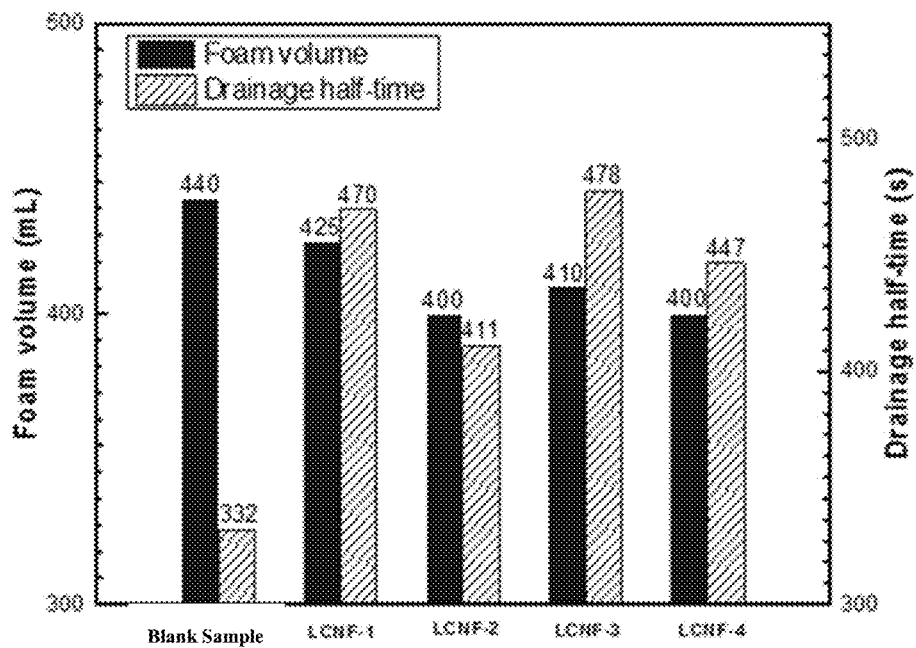
FIG. 4 shows comparison results of the stable foams in embodiments 2-5 and an ordinary foam (as a blank sample only containing a surfactant) in a foaming volume and a drainage half-life (containing 1 vol % of oil).

FIG. 4 shows comparison results of the stable foams in embodiments 2-5 and an ordinary foam (as a blank sample only containing a surfactant) in a foaming volume and a drainage half-life (containing 1 vol % of oil). The addition of crude oil causes foam instability and accelerates the foam drainage rate. It can be seen from FIG. 4 that compared to the blank sample, the LCNF-stabilized foam has a longer drainage half-life, indicating that the LCNF-stabilized foam has an excellent oil resistance.

Figure 5:
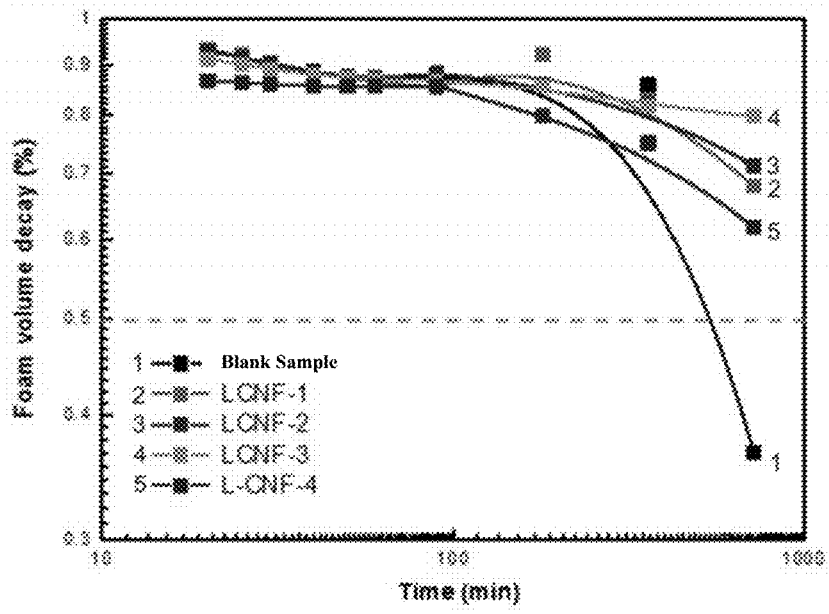
FIG. 5 shows comparison results of the stable foams in embodiments 2-5 and an ordinary foam (as a blank sample only containing a surfactant) in defoaming speed (without oil).

FIG. 5 shows comparison results of the stable foams in embodiments 2-5 and an ordinary foam (as a blank sample only containing a surfactant) in a defoaming speed (without oil). It can be seen from FIG. 5 that in the blank sample-stabilized foam has a higher defoaming speed and the foam volume decreases rapidly after 6 hours, while the LCNF-stabilized foam has a lower defoaming speed and no significant change occurs within 12 hours, indicating that the LCNF-stabilized foam has an excellent stability.

Figure 6:
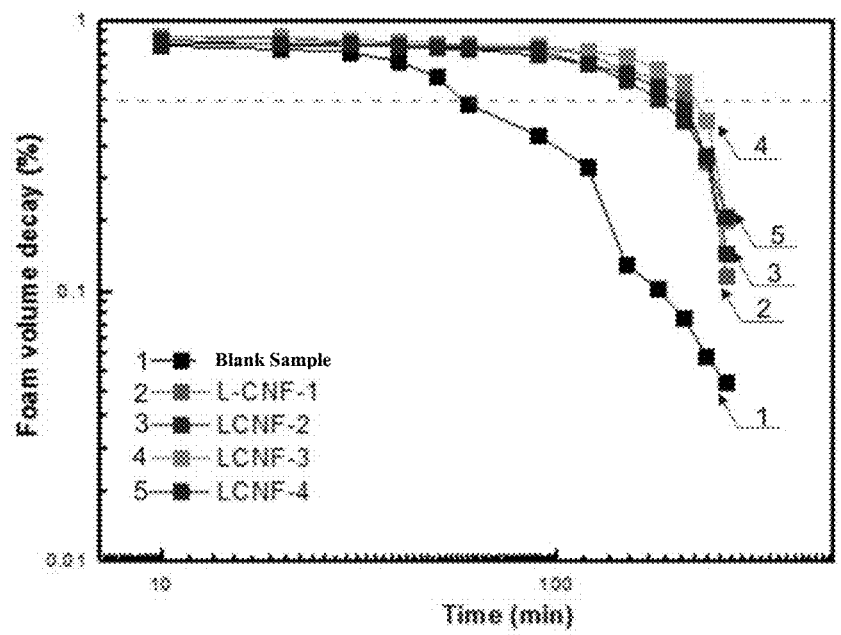
FIG. 6 shows comparison results of the stable foams in embodiments 2-5 and an ordinary foam (as a blank sample only containing a surfactant) in defoaming speed (containing 1 vol % of oil).

FIG. 6 shows comparison results of the stable foams in embodiments 2-5 and an ordinary foam (as a blank sample only containing a surfactant) in a defoaming speed (containing 1 vol % of oil). It can be seen from FIG. 6 that the blank sample-stabilized foam has a higher defoaming speed and the foam volume decreases rapidly after 30 minutes, while the LCNF-stabilized foam has a lower defoaming speed and the significant change occurs after 120 minutes, indicating that the LCNF-stabilized foam has an excellent stability.

Figure 7:
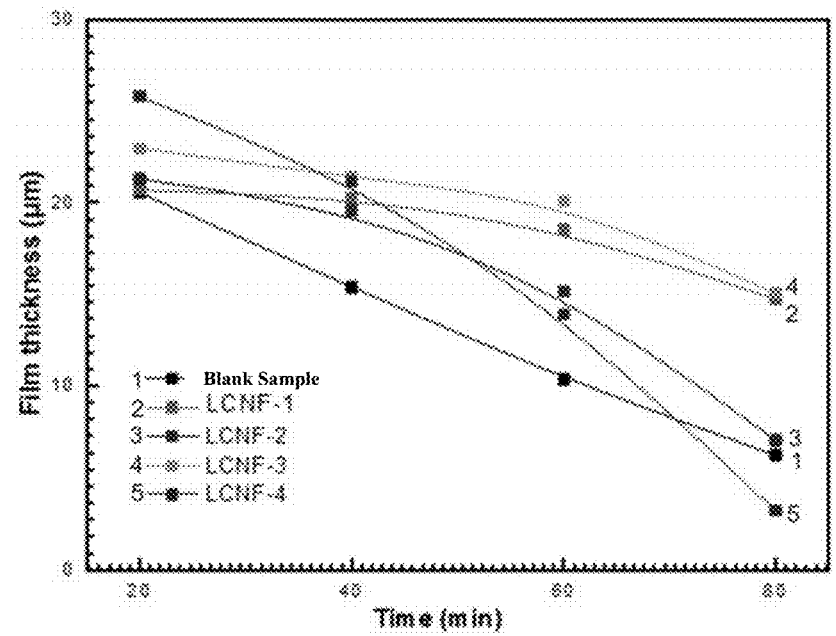
FIG. 7 shows comparison results of the stable foams in embodiments 2-5 and an ordinary foam (as a blank sample only containing a surfactant) in liquid film thickness (without oil).

FIG. 7 shows comparison results of the stable foams in embodiments 2-5 and an ordinary foam (as a blank sample containing only a surfactant) in a liquid film thickness (without oil). It can be seen from FIG. 7 that the liquid film thickness of the blank sample-stabilized foam decreases linearly with time, while the liquid film thickness of the LCNF-stabilized foam decreases more slowly, especially for the LCNF-1 and LCNF-3, which decrease the most slowly, indicating that that the LCNF-stabilized foam provided in the present invention has a good stability.

Figure 8:
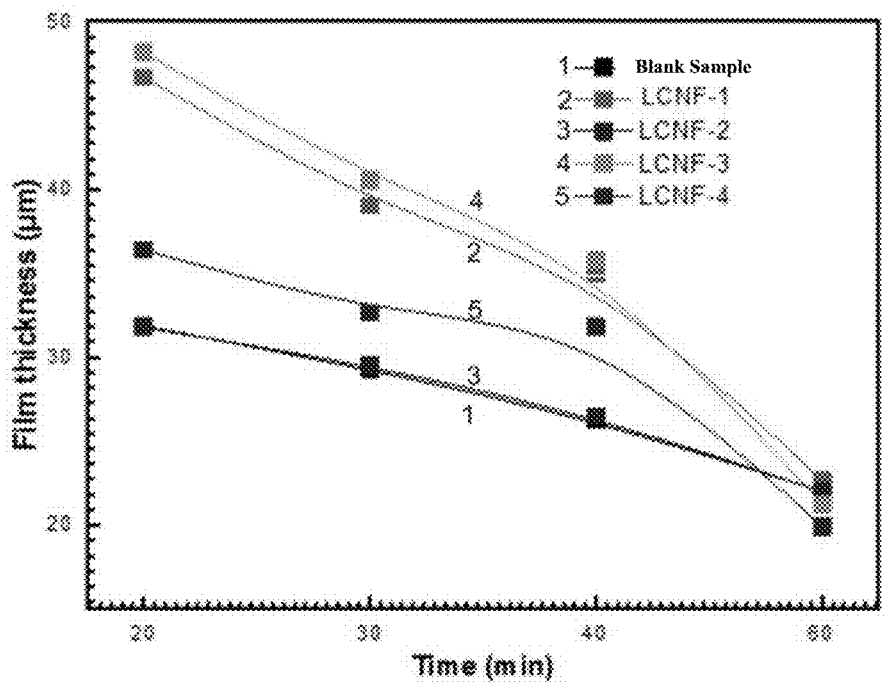
FIG. 8 shows comparison results of the stable foams in embodiments 2-5 and an ordinary foam (as a blank sample only containing a surfactant) in liquid film thickness (containing 1 vol % of oil).

FIG. 8 shows comparison results of the stable foams in embodiments 2-5 and an ordinary foam (as a blank sample only containing only a surfactant) in a liquid film thickness (containing 1 vol % of oil). It can be seen from FIG. 8 that although the liquid film thickness of the foam decreases rapidly with time, at the same time point, the liquid film thickness of the LCNF-stabilized foam is higher than that of the blank sample-stabilized foam, indicating that the stability of the LCNF-stabilized foam is better than that of the blank sample-stabilized foam.

Figure 9:
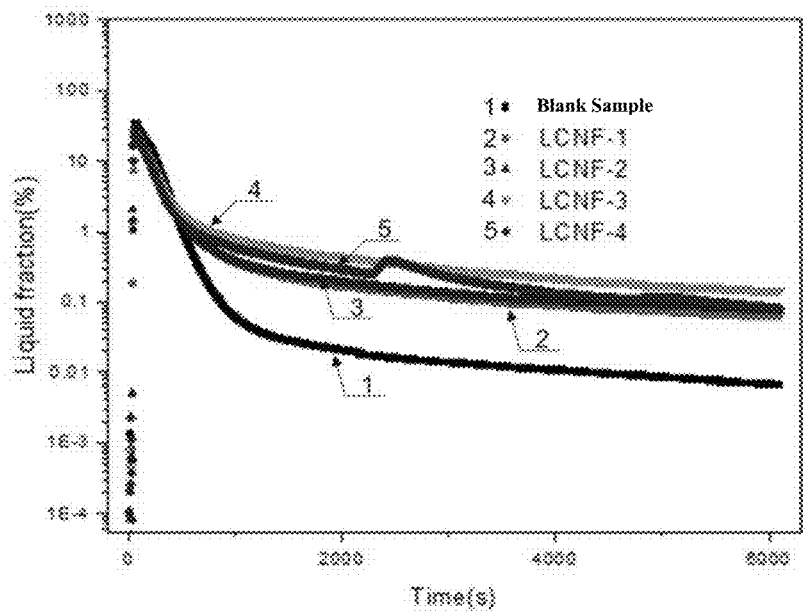
FIG. 9 shows comparison results of the stable foams in embodiments 2-5 and an ordinary foam (as a blank sample only containing a surfactant) in liquid film liquid fraction.

FIG. 9 shows comparison results of the stable foams in embodiments 2-5 and an ordinary foam (as a blank sample only containing a surfactant) in a liquid film liquid fraction. It can be seen from FIG. 9 that when the initial liquid fractions are equal, the liquid film liquid fraction of the LCNF-stabilized foam decreases significantly slower, which indicates that the LCNF-stabilized foam has a smaller drainage rate and is more stable.

A porous media with a rock core almost analogous to that of sandstone in pore permeability is used. The flow of foam in the porous media is simulated to measure the pressure difference between the rock core inlet and outlet. It can be seen from the test results that under the same experimental conditions, the pressure difference generated by the LCNF-stabilized foam is significantly higher than that of the blank sample-stabilized foam (Contains only a surfactant), especially for the LCNF-3. This phenomenon indicates that the stability of the LCNF-stabilized foam in the porous media is better.

The interfacial elasticity of a foam can suppress the foam coarsening and the collapse of the foam skeleton, thereby improving the stability of the foam. In the present invention, the dilational elasticity and viscosity at the gas-liquid interface of the foams are measured, and the measurement results are shown in Table 1.

TABLE 1

| | Results of interface elasticity of foams | | |
|---|---|---|---|
| Samples | Dilational modulus (mN/m) | Dilational elasticity (mN/m) | Dilational viscosity (mN/m) |
| Blank sample | 6.71 | 6.56 | 1.41 |
| LCNF-1 | 9.44 | 9.42 | 0.51 |

TABLE 1-continued

Results of interface elasticity of foams

| Samples | Dilational modulus (mN/m) | Dilational elasticity (mN/m) | Dilational viscosity (mN/m) |
|---|---|---|---|
| LCNF-2 | 12.35 | 12.34 | 0.36 |
| LCNF-3 | 14.94 | 14.91 | 1.04 |
| LCNF-3 | 10.91 | 10.84 | 1.24 |

As can be seen from Table 1, the interfacial elasticity of the LCNF-stabilized foams is 1.4-2.3 times higher than that of the ordinary foam, indicating that the stability of the LCNF-stabilized foams is good.

In the present invention, a foam scan instrument is used to measure the stability parameters of the foams, and the measurement results are shown in Table 2.

TABLE 2

Stability parameters of foams

| Samples | Foam expansion (FE) | Foam capacity (FC) | FVS (stability index) |
|---|---|---|---|
| Blank sample | 6.8 | 1.35 | 2.23 |
| LNCF-1 | 6.7 | 1.35 | 9.07 |
| LNCF-2 | 6.7 | 1.36 | 9.39 |
| LNCF-3 | 6.9 | 1.39 | 11.58 |
| LNCF-4 | 10.1 | 1.28 | 9.68 |

It can be known from Table 2 that the stability index of the LCNF-stabilized foams is significantly higher than that of the blank sample-stabilized foam, which is increased by 4.1-5.2 times relative to the blank sample-stabilized foam, indicating that the LCNF-stabilized foams have a good stability.

What is claimed is:

1. A stable foam system based on a lignocellulosic nanofibril material, comprising: 0.1-1.0 wt % of the lignocellulosic nanofibril material, 0.2-1.0 wt % of a surfactant, 0.1-10 wt % of sodium chloride, 0.1-1.0 wt % of calcium chloride, 0.1-1.0 wt % of magnesium chloride, 0-0.04 wt % of sodium sulfate, and a balance of water;
   wherein the lignocellulosic nanofibril material comprises: 0.5-20 wt % of wood flour, 0.1-10 wt % of (2,2,6,6-tetramethylpiperidin-1-yl)oxidanyl TEMPO), 2-25 mmol/g of an oxidant, 6-15 wt % of NaBr, and a balance of water.

2. The stable foam system based on the lignocellulosic nanofibril material according to claim 1, comprising: 0.1 wt % of the lignocellulosic nanofibril material, 0.4 wt % of the surfactant, 3.44 wt % of the sodium chloride, 0.64 wt % of the calcium chloride, 0.18 wt % of the magnesium chloride, 0.018 wt % of the sodium sulfate, and a balance of water.

3. The stable foam system based on the lignocellulosic nanofibril material according to claim 1, wherein the surfactant is a mixture of sodium secondary alkyl sulfonate and α-alkenyl sulfonate in a molar ratio of 1:1.

4. The stable foam system based on the lignocellulosic nanofibril material according to claim 1, wherein the stable foam system is applied in an oil field exploitation.

5. The stable foam system according to claim 1, wherein the lignocellulosic nanofibril material comprises 15 wt % of the wood flour, 5 wt % of the TEMPO, 10 mmol/g of the oxidant, 12 wt % of the NaBr, and a balance of water.

6. The stable foam system according to claim 1, wherein the wood flour has a particle size of 20-120 mesh, and the oxidant is NaClO or $NaClO_2$.

7. The stable foam system based on the lignocellulosic nanofibril material according to claim 2, wherein the surfactant is a mixture of sodium secondary alkyl sulfonate and α-alkenyl sulfonate in a molar ratio of 1:1.

8. The stable foam system based on the lignocellulosic nanofibril material according to claim 2, wherein the stable foam system is applied in an oil field exploitation.

9. The stable foam system based on the lignocellulosic nanofibril material according to claim 3, wherein the stable foam system is applied in an oil field exploitation.

* * * * *